Aug. 4, 1931.   G. H. EMERSON   1,817,811
FEED WATER HEATING SYSTEM FOR LOCOMOTIVES
Filed July 17, 1926   5 Sheets-Sheet 1
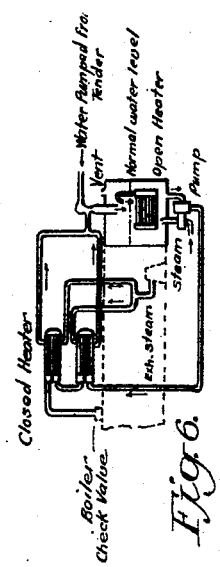
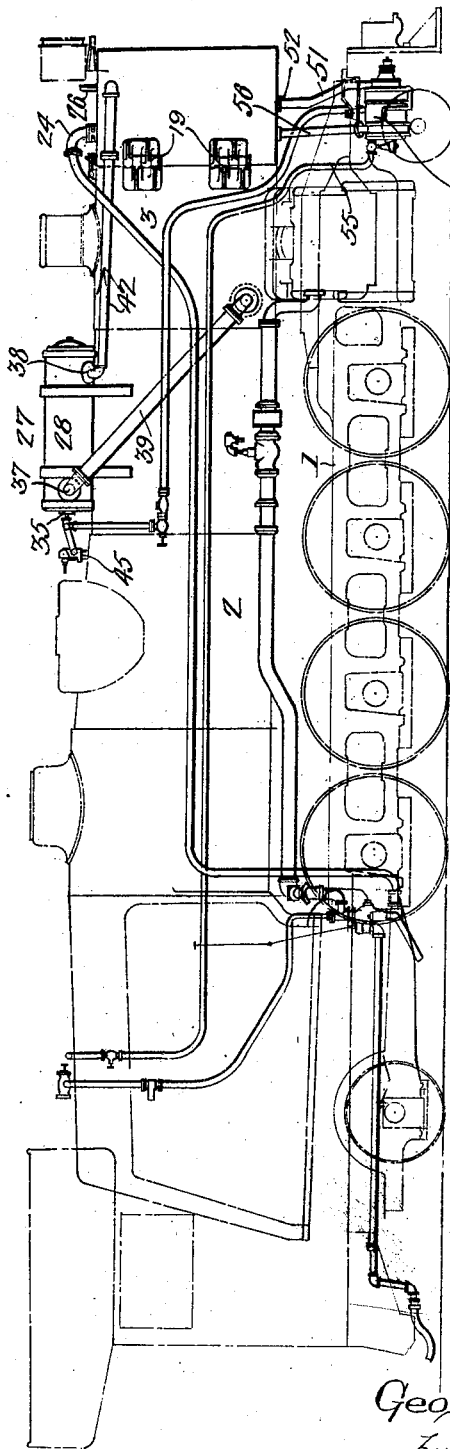
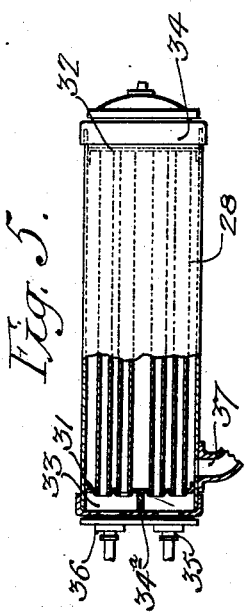
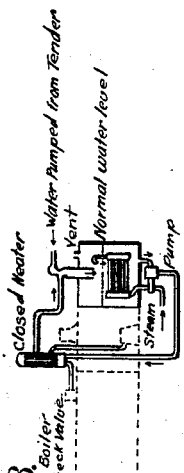
Inventor:
George H. Emerson,
by his Attorneys,
Howson & Howson

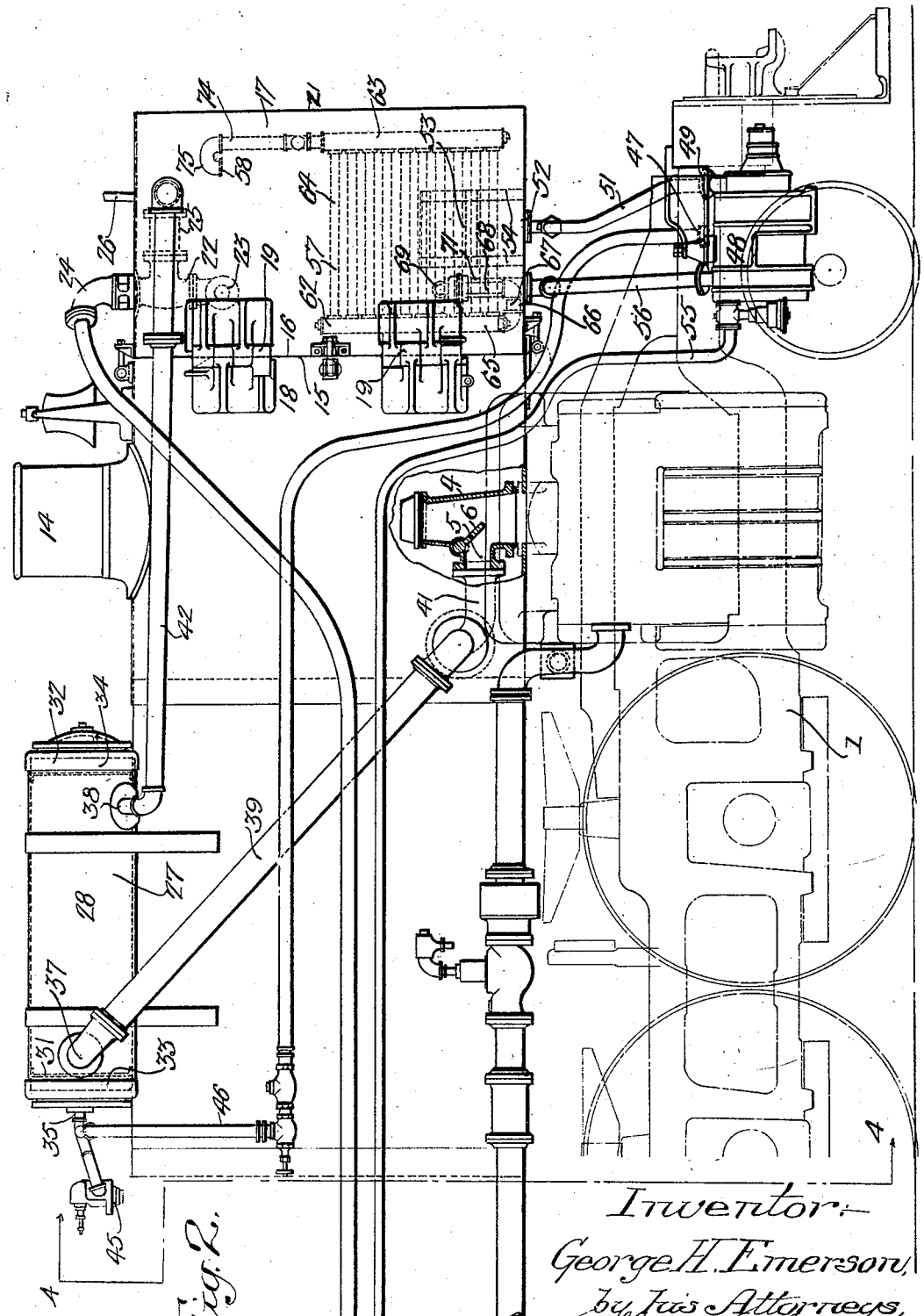

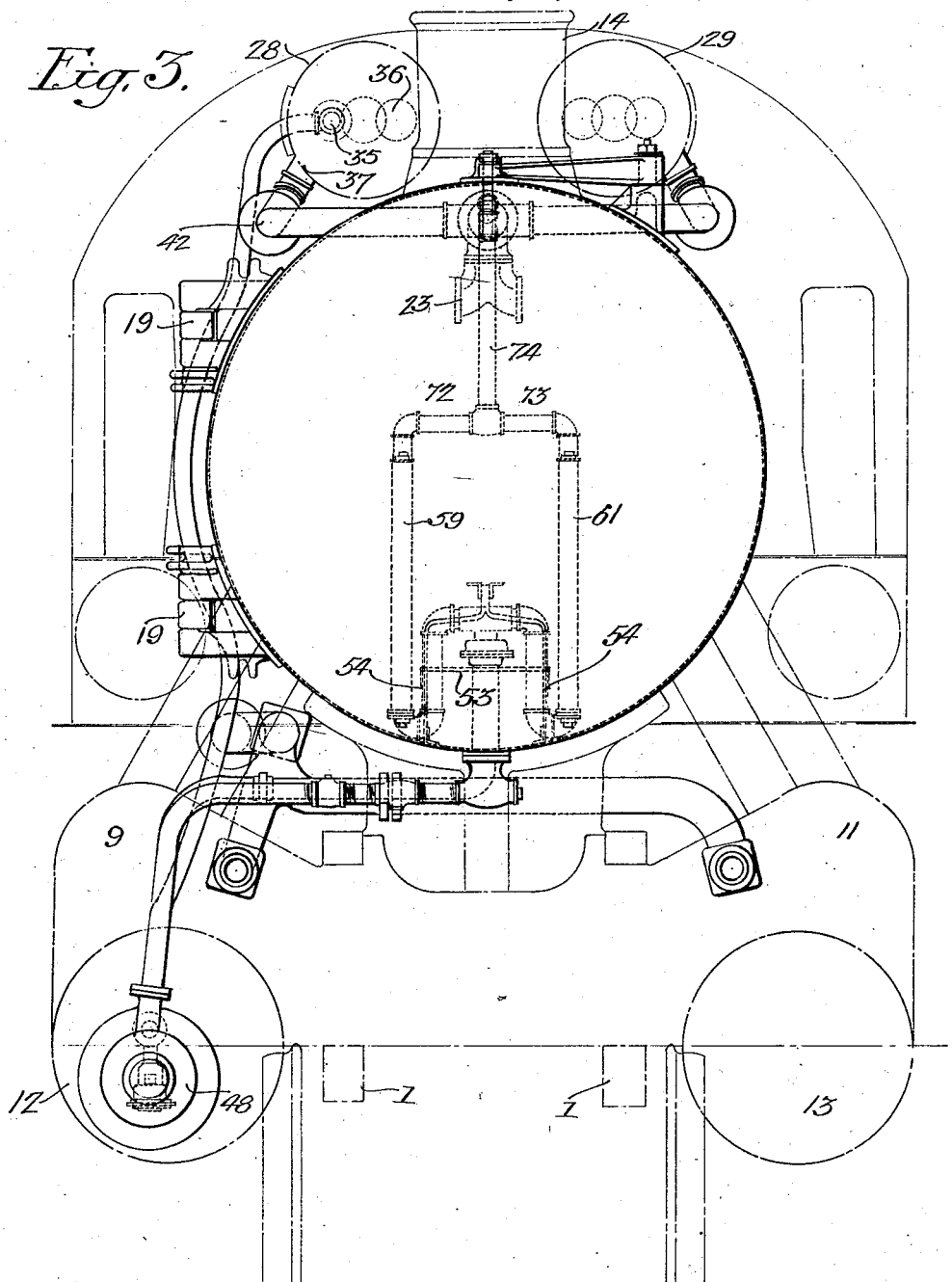

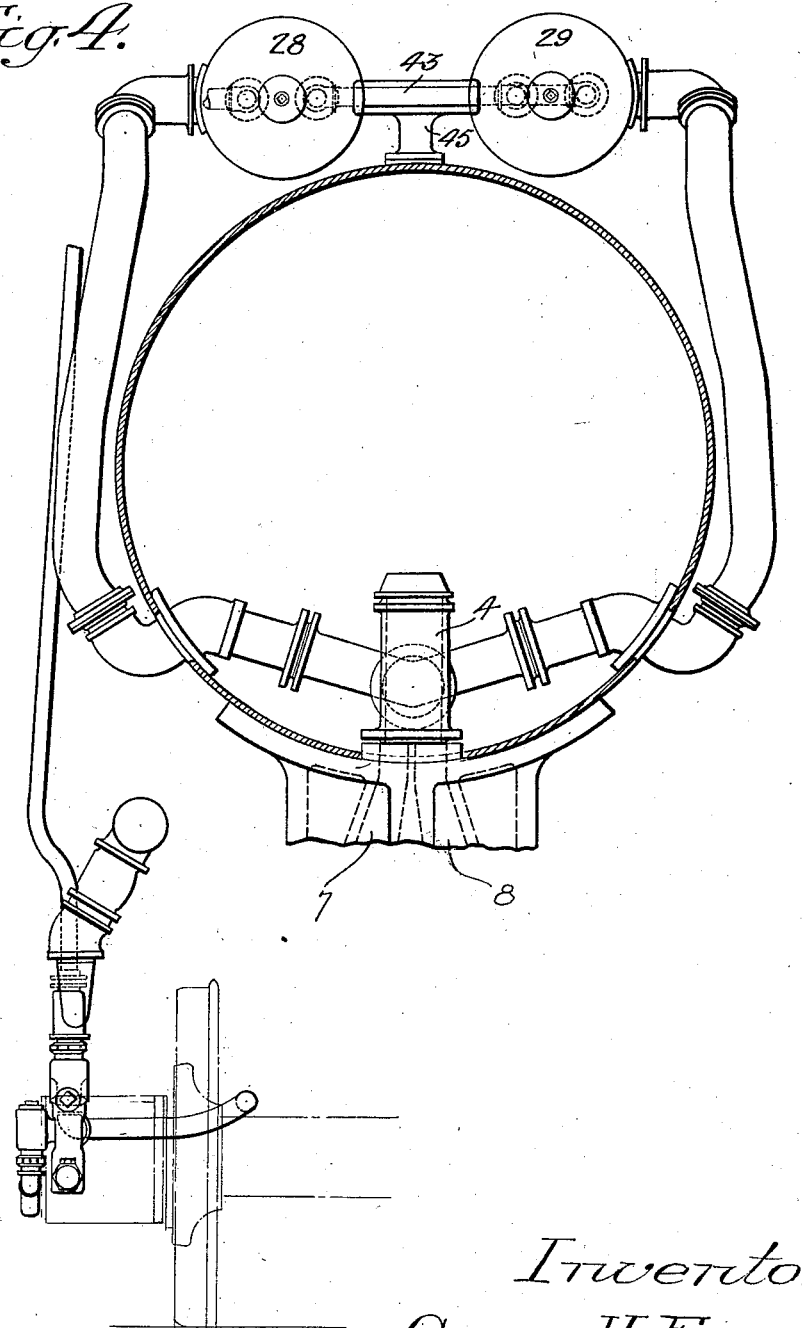

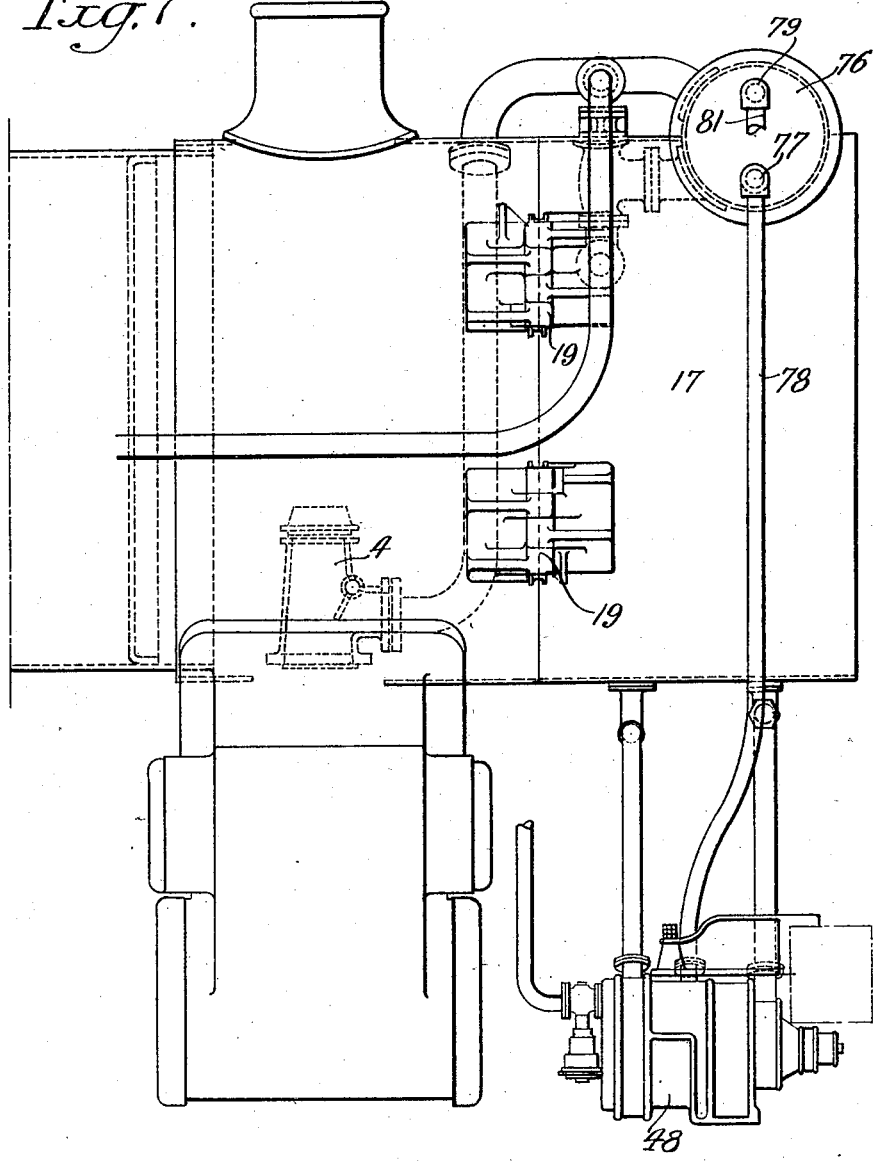

Patented Aug. 4, 1931

1,817,811

UNITED STATES PATENT OFFICE

GEORGE H. EMERSON, OF BALTIMORE, MARYLAND

FEED-WATER HEATING SYSTEM FOR LOCOMOTIVES

Application filed July 17, 1926. Serial No. 123,185.

My invention relates to locomotives and it has particular relation to locomotive feed-water heating systems.

One object of my invention is to provide a feed-water heating system, whereby the feed water may be supplied to the locomotive boiler at an extremely high temperature.

Another object of my invention is to provide a system of the class described, wherein the feed water is first preheated to a temperature permitting the liberation of the gases and thereafter further heated prior to insertion into the boiler.

A further object of my invention is to provide a feed-water heating system, wherein the temperature of the water in a degasifying chamber is raised by a condenser supplied with exhaust steam from a pump for propelling the feed water from said chamber to a closed feed-water heater, the outlet of said condenser being so disposed that the discharge therefrom also serves to increase the temperature of the feed water in the chamber. A reduction in the back pressure on the pump is also effected by this condenser.

With these and other objects and applications in mind, my invention further consists in the details of construction and operation hereinafter set forth and claimed and illustrated in the accompanying drawings, wherein Fig. 1 is a side elevational view of a locomotive embodying my invention;

Fig. 2 is an enlarged view of the front end of the locomotive;

Fig. 3 is a front elevation of the locomotive;

Fig. 4 is a skeleton transverse sectional view taken on the line IV—IV of Fig. 2, a number of parts being omitted for the sake of clarity;

Fig. 5 is a fragmentary plan view showing the feed-water heater;

Fig. 6 is a diagram of the installation shown in Figs. 1 through 5;

Fig. 7 is a similar view to Fig. 1, but illustrating a modification of my invention; and Fig. 8 is a diagram of the modified installation shown in Fig. 7.

Referring to the drawings, a locomotive frame 1 constitutes a support for a boiler 2 and a smoke box 3, the latter being mounted on the forward end of said boiler. The smoke box 3 is provided with a centrally positioned exhaust nozzle 4 having an outlet 5 controlled by a valve 6, for reasons as will presently appear. The exhaust nozzle 4 is connected by exhaust steam passages 7 and 8 to valve chambers 9 and 11 of cylinders 12 and 13 respectively positioned on the opposite sides of the locomotive. A smoke stack 14 extends from the upper side of the smoke box 3 in direct alignment with the exhaust nozzle 4.

A forward open end 15 of the smoke box 3 may be normally closed by an imperforate plate 16 constituting a rear wall for a feed-water tank 17. The diameter of the tank 17 is such that the walls thereof are substantially a continuation of the walls of the smoke box 3. The tank 17 is movably mounted on an adjacent front wall portion 18 of the smoke box 3 by means of vertically positioned hinges 19, permitting a swinging movement in a horizontal plane. Thus, when the tank 17 is in the position shown in Fig. 1 of the drawings, the rear wall 16 thereof constitutes a front wall for the open end 15 of the smoke box 3. However, when the tank 17 is swung about the hinges 19, access may be had to the smoke box 3 through the open end 15. The structure of the tank 17 is completed by means of a front wall 21 paralleling the rear wall 16.

An eductor condenser 22 is positioned in the upper side of the tank 17 with a discharge outlet 23 thereof extending inwardly of said tank. Feed water may be supplied to the condenser 22 through a pipe 24 in the usual manner. Exhaust steam may also be supplied to the condenser 22 through a pipe 25 in order to preheat the feed water, as will presently appear. The temperature of the feed water in the tank 17 is such that the gases are readily liberated therefrom so that the tank 17 thus in effect forms a degasifying chamber. A substantially unobstructed vent may be had for the gases through an opening 26 in the upper wall of the tank 17.

A closed feed-water heater 27 comprising sections 28 and 29, may be mounted on the upper side of the boiler 2. The section 28 is provided with spaced heads 31 and 32 forming end chambers 33 and 34, respectively. The chamber 33 is provided with a central division wall 34ᵃ forming two chambers, of which one is provided with an inlet opening 35 and the other an outlet opening 36. Thus, a two-pass unit is formed.

The space intermediate the heads 31 and 32 may be supplied with steam through an inlet opening 37 and discharged therefrom through an outlet 38. The inlet opening 37 of the section 28 is connected by means of pipes 39 and 41 to the outlet 5 for the exhaust steam for the nozzle 4. The outlet 38 is connected by means of pipes 42 and 25 to the condenser 22. The openings 37 and 38 of the other section 29 are similarly connected to the common exhaust pipe 41 leading from the nozzle 4 and to the common pipe 25 leading to the condenser 22. Thus exhaust steam is initially passed from the exhaust nozzle 4 through the sections 28 and 29 of the heater 27 and thereafter condensed in the eductor condenser 22 which discharges into the tank 17.

The outlet 36 of the heater section 28 is connected to the inlet 35 of the other section by means of a pipe 43, while the outlet 36 of the section 29 is connected by means of a pipe and check valve 45 to the boiler 2.

Feed water to be preheated in the closed heater 27 may be supplied thereto through a pipe 46 extending from a discharge outlet 47 of a rotary steam driven pump 48. The pump 48 has a suction opening 49 which is connected by means of a pipe 51 to a discharge outlet 52 in the bottom of the degasifying chamber 17. A vortex may be prevented at this point by means of a baffle plate 53 supported directly over the outlet 52 by means of legs 54.

The rotary pump 48 may be supplied with steam through a pipe 55 leading from the boiler 2. In accordance with my invention, exhaust steam from the pump 48 is passed through a pipe 56 up into a condenser 57 which is positioned in the bottom portion of the tank 17 so as to be partially immersed in the feed water. The condensate may be discharged through an outlet 58 positioned in the upper portion of the tank 17.

The condenser 57 may comprise sections 59 and 61. The section 59 includes a pair of spaced vertically extending manifolds 62 and 63 which are interconnected by pipes 64. A lower end 65 of the manifold which is adjacent to the rear wall 16 of the casing 17, is provided with a supply pipe 66 comprising a horizontal section 67, a vertical section 68 and a second horizontal section 69, the latter terminating in a vertical section 71 constituting an extension of the pump exhaust pipe 56 positioned within the casing 17. An upper end of the manifold 63, which is positioned adjacent to the front wall 21 of the casing 17, is provided with a horizontal section 72 which connects with a similar section 73 extending from the other condenser section 61. A common exhaust pipe 74 extends from the meeting pipes 72 and 73 upwardly in the tank 17 above the level of the feed water and terminates in a downwardly extending section 75 having the discharge outlet 58. The condenser section 61 is similar to the section 59.

In operation, when water is supplied to the educator-condenser 22 through the pipe 24, a vacuum is created in said condenser causing a passage of steam from the discharge nozzle 4 through the closed feed-water heater 27 to the educator condenser 22, thereby preheating the feed water before being discharged into the tank 17. The temperature of the feed water resulting from such preheating is such that the gases are readily liberated, passing off from the tank through the vent 26. The feed water is further heated by the exhaust steam from the pump 48, passing through the condenser 57, the resulting condensate being discharged into the tank 17 through the outlet 58. The effect of the condenser 57 is also to decrease the back pressure on the pump 48.

The operation of the pump causes the degasified feed water to pass from the bottom of the tank 17 up through the closed feed-water heater 27 where the water is further heated by exhaust steam and thereafter discharged into the boiler 2 through the check valve 45.

As above noted, the exhaust steam passing from the rotary pump 48 is conveyed to the condenser 57 which is immersed in the feed water contained in the tank 17. The resulting condensate is finally discharged into the tank 17 through the condenser outlet 58. Thus, the back pressure on the pump 48 is not only reduced by the feed water but the feed water is also further heated while undergoing degasification in the tank 17.

The structure disclosed in Fig. 7 differentiates over that shown in the preceding figures only in the fact that the closed sectional feed-water heater 27 is replaced by a single heater 76, which is transversely mounted on the upper side of the movable tank 17. The heater 76 is provided with an inlet opening 77 which is connected by means of a pipe 78 to the pump 48 and also a discharge outlet 79 having a connection by means of a pipe 81 with the boiler 2, as in the preceding figures. The operation is substantially identical to that previously set forth for Figs. 1 and 2.

While I have shown only two embodiments of my invention for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. A locomotive feed-water casing; means for supplying preheated feed water thereto; steam operated means for propelling the feed water from said casing; and a tubular condenser positioned in the feed water contained in said casing, said condenser having an inlet opening connected to receive the exhaust steam from said propelling means and also provided with an outlet positioned to discharge into said casing.

2. A locomotive having a feed-water tank provided with means for allowing the escape of liberated gases; a condenser extending inwardly of said tank; means for supplying feed water and steam to said condenser, whereby the feed water discharged therefrom may be preheated preliminary to injection into the boiler; steam operated means for propelling the degasified feed water from said tank; and a tubular condenser immersed to a desired extent in the feed water contained in said tank and provided with an inlet opening connected to receive the exhaust steam from said propelling means and also provided with an outlet adapted to discharge into said tank.

3. The combination in a locomotive, of a smoke box; a casing located in advance of the smoke box; a condenser located within the casing, means for supplying feed water and steam to said condenser, whereby the temperature of the feed water in the casing may be such as to permit the liberation of the gases in said feed water, said casing having a substantially unrestricted opening for venting the liberated gases; steam operated pumping means for propelling the degasified feed water from said casing; and a condenser for the exhaust steam from said propelling means substantially immersed in the feed water contained in said casing and having an outlet positioned to discharge into said casing.

4. A locomotive having a feed-water tank provided with means for allowing the escape of liberated gases; means for introducing feed water into said tank at a temperature permitting the liberation of the gases in the water; a closed feed-water heater; means including a steam operated pump for propelling the degasified feed water from said tank to said closed heater; and a tubular condenser for the exhaust steam from said pump positioned within said feed-water tank.

5. A locomotive having an open feed-water tank; means including a condenser for introducing feed water into said tank; a closed feed-water heater; means including a steam operated pump for propelling the feed water from said tank to said closed heater; and a tubular condenser for the exhaust steam from said pump positioned within said tank.

6. A locomotive boiler; a feed-water tank provided with means for allowing the escape of liberated gases; a condenser; means for supplying feed water and steam to said condenser; a closed feed-water heater connected to said boiler; means including a steam operated pump for propelling the feed water from said tank to said heater; and a tubular condenser for the exhaust steam from said pump substantially immersed in the feed water in said tank.

7. In combination, a locomotive boiler; a smoke box; a feed-water tank; a condenser positioned to discharge into said tank; means for supplying feed water to said condenser; a closed feed-water heater connected to said boiler; means including a steam operated pump for propelling feed water from said tank to said closed heater; a tubular condenser for the exhaust steam from said pump positioned within said tank; and means for supplying exhaust steam to said closed feed-water heater and to said first-mentioned condenser.

8. In a steam engine the combination of a smoke box; an open feed-water tank positioned in front of said smoke box; means for supplying feed-water to said tank, comprising a condenser; a closed feed-water heater situated above said smoke box; means for supplying said closed heater with exhaust steam; means for conducting the exhaust steam thence to the condenser; steam operated means for forcing feed water from the tank to said closed heater; and a tubular condenser partly immersed in the tank for discharging the exhaust steam from the last mentioned means into said tank.

GEORGE H. EMERSON.